March 17, 1964  E. F. GORMAN ETAL  3,125,666
SECONDARY SHIELDING SYSTEM
Filed Jan. 9, 1962  2 Sheets-Sheet 1

INVENTORS
EUGENE F. GORMAN
ROBERT J. NELSON
BY Richard S. Shreve Jr
ATTORNEY

March 17, 1964 E. F. GORMAN ETAL 3,125,666
SECONDARY SHIELDING SYSTEM
Filed Jan. 9, 1962 2 Sheets-Sheet 2

INVENTORS
EUGENE F. GORMAN
ROBERT J. NELSON
BY Richard S. Shreve, Jr.
ATTORNEY

3,125,666
SECONDARY SHIELDING SYSTEM
Eugene F. Gorman, Morris Plains, and Robert J. Nelson, Elizabeth, N.J., assignors to Union Carbide Corporation, a corporation of New York
Filed Jan. 9, 1962, Ser. No. 165,196
8 Claims. (Cl. 219—74)

This invention relates to secondary shielding systems, and constitutes an improvement upon the disclosure of the copending application of Gorman et al., Serial No. 24,325, filed April 25, 1960 for "Gas Stream Shielded Arc Working," now Patent No. 3,053,967 dated Sept. 11, 1962.

The main object of the present invention is to improve both primary and secondary shielding sources which produce coherent streaming. Other objects are to project at least two gas streams of different compositions through great distances into free space without intermixture, particularly in welding at high shield-to-work distances.

Figure 1:
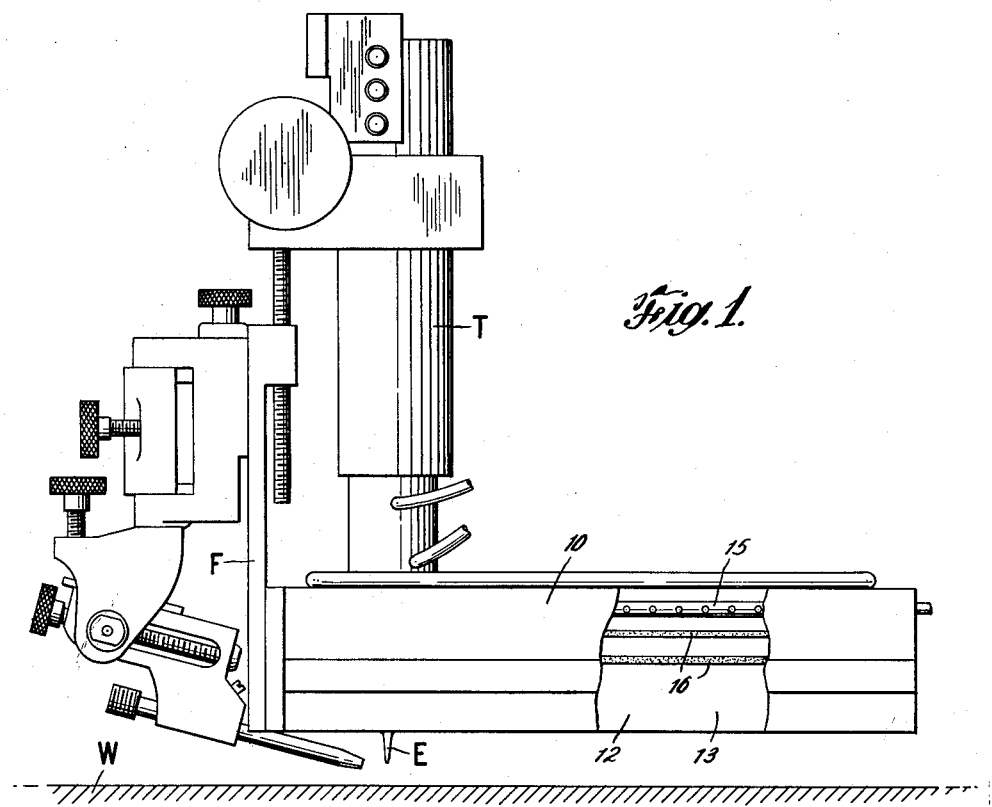
FIG. 1 is an elevation of apparatus according to and for carrying out the method of the preferred embodiment of the present invention.
Figure 2:
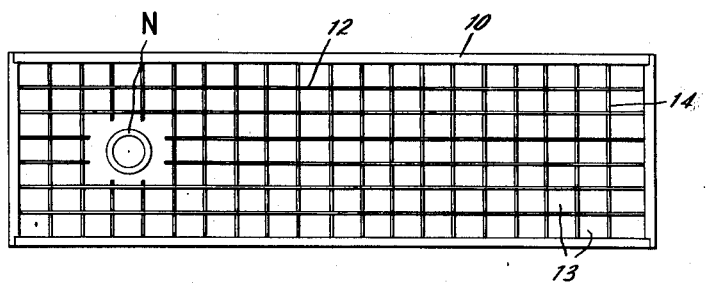
FIG. 2 is a bottom plan of a portion of FIG. 1.

The apparatus shown in FIG. 1 comprises an inert gas-shielded arc torch T which maintains an arc between an electrode E and a workpiece W while advancing along a path thereon, and a nozzle N which passes a stream of shielding gas along the electrode E to shield the moving arc. The torch T is carried by a frame F, which also supports the auxiliary shield according to the present invention.

Attached to the torch T is a box-shaped auxiliary shield 10 of rectangular cross section having a grid 13 therein comprising parallel vertical longitudinal plates or partitions 12, and parallel vertical transverse partitions 14 therebetween. Mounted in the shield 10 above the grid 13 is a supply tube 15 having outlet orifices spaced therealong for distribution of the shielding gas. With this construction, the major wall surfaces of the grid are parallel to the direction of flow of the auxiliary shielding gas, and form gas passages of substantially equal cross sectional area.

Both sets of partitions are preferably uniformly spaced apart in this form, and the side walls of the frame 10 are preferably transparent, to permit increased visibility within the welding zone. For optional use when the shielding gas contains no gas borne particles, one or more layers 16 of porous material such as porous bronze are mounted between the tube 15 and the grid 13 to serve as diffuser plates for the gas distributed by the perforated tube 15.

Figure 3:
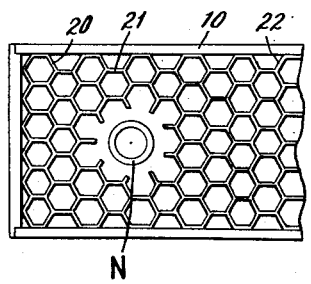
FIG. 3 is a similar view of a modification.

In the honeycomb form shown in FIG. 3, the gas passages are hexagonal, formed by three sets 20, 21 and 22 of parallel walls 120 degrees apart. In both forms, the bottoms of the grids are preferably flush with the lower face of the shield.

Heliarc welds were made on $\frac{1}{16}$ in. thick stainless steel with and without the grids and operating at a trail-to-work elevation of $1\frac{1}{2}$ in. Welding conditions were 25 i.p.m., 125 amperes D.C.S.P., and 10 arc volts. Argon flows of 10 c.f.h. through the nozzle and 120 c.f.h. through the auxiliary shield were used. As would be expected at this extreme elevation, little or no weld protection was obtained when a grid was not used. The weld surface was rough and discolored because of a high degree of oxidation. With the rectangular grid installed, a substantial improvement in protection was obtained. The single layer of the hexagonal grid yielded an even greater improvement, but with two layers of the hexagonal grid, the degree of protection was complete, resulting in a smooth, bright, silvery weld bead surface. When the double layer of hexagonal grid was installed, the hexagonal channels of one grid layer were offset with respect to the other layer. At a higher flow of about 150 c.f.h. argon, complete protection was also obtained with a rectangular grid. Without a grid, however, increased flow rates produced no significant improvements. Instead, it was necessary to reduce the shield elevation to about $\frac{3}{8}$ in. for acceptable results.

Figure 4:
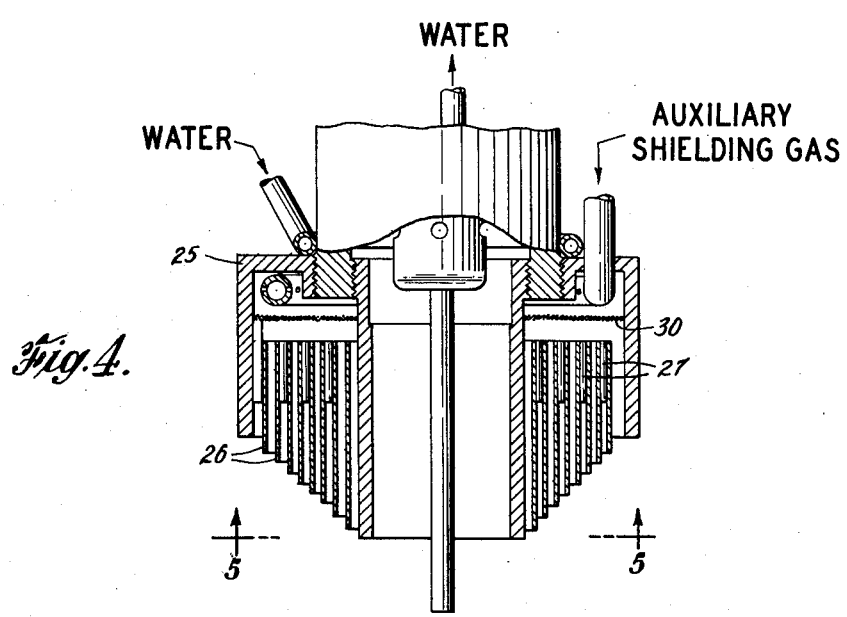
FIG. 4 is a vertical axial section of a further modification.
Figure 5:
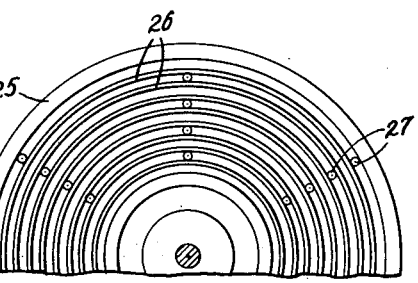
FIG. 5 is a bottom plan of FIG. 4.
Figure 6:
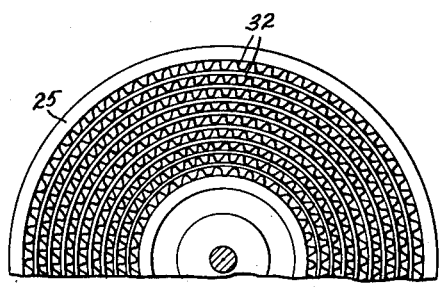
FIG. 6 is a similar view of a similar modification.

In the form shown in FIGS. 4 and 5, the shield is composed of a main housing 25 having relatively thick metal wall surfaces which are water-cooled. A multiple wall insert consisting of concentric thin wall metal tubes 26 is inserted into the main housing. The tubes are supported in spaced relationship with one another and with the main housing by means of wire pins 27 welded to the tubes. These pins must be employed in a special manner so that they do not cause air infiltration into the auxiliary gas stream. As shown in FIG. 4, the pin ends terminate well above the ends of the nozzles and, in addition, their locations are staggered to prevent their forming a continuous open path in the exiting gas stream through which air can infiltrate. A wire screen 30 acts to supply each annulus with a balanced quantity of shielding gas. FIG. 6 shows one of the many alternate constructions in which the pins are replaced by corrugated walls 32 which act to support and strengthen the nozzle assembly.

The annular spacing between cylinders is preferably kept small and in the order of $\frac{3}{16}$ in. or less. The outside diameter of the shielding device can be as large as desired and is determined primarily by the surface area of shielding required on the weldment. The relationship between the weldment surface to be shielded and the cross-section of the auxiliary shield are approximately in a 1:1 ratio.

In some cases, materials such as high temperature ceramics, can be used in place of metal for the insert and/or the outer housing. As a further aid to ensure unobstructed vision of the weld zone, the terminal ends of the walls are each slightly retracted with respect to their inner neighbors.

In addition to producing coherent-streaming with select gases, the invention has been successfully practiced for the same purpose with streams of gas borne particles (fluxes). Such particles were projected into the weld zone with precise control over the areas on which such particles impinge. Similarly, particles of different characteristics can be used according to zone requirements. For example, particles for use in a primary zone were selected from materials which provided one or more of the following effects: change of electrode melt of rates, alteration in arc voltage, deoxidation of the weld metal during the molten puddle stage, weld metal alloying constituents for improved weld metal properties, and control over puddle fluidity to promote the formation of a desired weld surface. For a secondary zone, a different set of criteria for selecting the particles existed. For example, particles were used which primarily acted as a blanket for the heat affected zone and solidified weld metal, to insure protection for some time after the torch has moved away from the zone.

What is claimed is:

1. Gas stream shielded arc working which comprises maintaining an electric arc between an electrode and a workpiece while advancing said arc along a path, passing a stream of primary shielding gas along the electrode to shield the moving arc, passing an auxiliary stream of shielding gas along a multiplicity of partitions the major wall surfaces of which are parallel to the direction of flow of such gas to sub-divide the gas into a multiplicity of branches, directing said branches against the workpiece, and advancing said branches along said path in trailing relation to said moving arc.

2. Process of protecting portions of the workpiece trailing a moving arc shielded by a primary gas stream from ambient atmosphere which comprises discharging auxiliary workpiece shielding gas through a grid of partitions the major wall surfaces of which are parallel to the direction of flow of such gas and act to generate gas laminae adjacent such wall surfaces that create extended gas sheaths after leaving the latter, which primary shielding gas stream surrounds such arc and which auxiliary gas sheaths are directed against trailing portions of the workpiece, protecting both from the ambient atmosphere.

3. In a gas-shielded arc torch the combination with an elongated electrode, a nozzle surrounding the end portion of such electrode in spaced concentric relation, and means for supplying primary arc shielding gas to the space between such electrode and the inside of said nozzle for discharge therefrom to shield an arc energized between the end of said electrode and a workpiece, of an auxiliary nozzle mounted in trailing relation to said torch, means for supplying shielding gas to said auxiliary nozzle, and means for generating a multiplicity of auxiliary shielding gas-sheaths in the gas stream that is discharged from said auxiliary nozzle, comprising a grid of partitions mounted in the outlet of said auxiliary nozzle, the major wall surfaces of which are parallel to the direction of flow of such auxiliary shielding gas.

4. An insert for an auxiliary nozzle trailing a gas shielded arc torch to provide a flow of workpiece shielding gas, said insert consisting of a grid of partitions the major wall surfaces of which are parallel to the direction of flow of such workpiece shielding gas, and means for securing said insert in the outlet of said auxiliary nozzle to allow substantial elevation of said auxiliary nozzle with optimum shielding of portions of the workpiece trailing the arc.

5. An insert for an auxiliary nozzle trailing a gas shielded arc torch to provide a flow of workpiece shielding gas, said insert consisting of a grid of partitions the major wall surfaces of which are parallel to the direction of flow of such workpiece shielding gas, and substantially uniformly spaced apart to form gas passages of substantially equal cross-sectional area, and means for securing said insert in the outlet of said auxiliary nozzle to allow substantial elevation of said auxiliary nozzle with optimum shielding of portions of the workpiece trailing the arc.

6. Gas stream shielded arc working which comprises maintaining an electric arc between an electrode and a workpiece while advancing said arc along a path, passing a stream of shielding gas along the electrode to shield the moving arc, passing an auxiliary stream of shielding gas along a multiplicity of partitions the major wall surfaces of which are parallel to the direction of flow of such auxiliary shielding gas to sub-divide the gas into a multiplicity of branches surrounding said electrode shielding stream, directing said branches against the workpiece, and advancing said branches along said path in surrounding relation to said moving shielded arc.

7. Gas stream shielded arc working which comprises maintaining an arc between an electrode and a workpiece while advancing the arc along a path, passing a stream of shielding gas along the electrode to shield the moving arc, passing an auxiliary stream of shielding gas along a multiplicity of partitions the major wall surfaces of which are parallel to the direction of flow of such auxiliary shielding gas to sub-divide the gas into a multiplicity of branches, supplying adjuvant particles to at least a portion of said branches to render them gas borne, and directing said gas borne particle branches in a coherent streaming flow pattern against at least one selected area of the workpiece with precise control over the area on which such particles impinge.

8. Gas stream shielded arc working which comprises maintaining an electric arc between an electrode and a workpiece while advancing said arc along a path, passing a stream of primary shielding gas along the electrode to shield the moving arc, passing auxiliary stream of gas of different composition along a multiplicity of partitions the major wall surfaces of which are parallel to the direction of flow of both gases to sub-divide the auxiliary stream into a multiplicity of branches, directing said branches against the workpiece, and advancing said branches along said path with said moving arc, whereby the two gas streams of different compositions are projected through great distances into free space without intermixture at high shield to work distances.

References Cited in the file of this patent
UNITED STATES PATENTS

| | | |
|---|---|---|
| 2,644,070 | Herbst | June 30, 1953 |
| 2,856,510 | Jones et al. | Oct. 14, 1958 |
| 2,866,074 | Ronay | Dec. 23, 1958 |
| 2,902,587 | Bernard | Sept. 1, 1959 |
| 2,918,563 | Ternisie et al. | Dec. 22, 1959 |
| 2,959,666 | Tuthill | Nov. 8, 1960 |
| 2,977,457 | Houldcraft et al. | Mar. 28, 1961 |